(12) United States Patent
Trajkovic et al.

(10) Patent No.: US 6,696,978 B2
(45) Date of Patent: Feb. 24, 2004

(54) COMBINED LASER/RADAR-VIDEO SPEED VIOLATION DETECTOR FOR LAW ENFORCEMENT

(75) Inventors: Miroslav Trajkovic, Ossining, NY (US); Srinivas Gutta, Buchanan, NY (US); Antonio J. Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 45 days.

(21) Appl. No.: 09/879,699

(22) Filed: Jun. 12, 2001

(65) Prior Publication Data

US 2002/0186148 A1 Dec. 12, 2002

(51) Int. Cl.[7] ................................................ G08G 1/01
(52) U.S. Cl. ........................ 340/936; 340/937; 340/933
(58) Field of Search ................................ 340/936, 937, 340/933; 701/117, 118, 119

(56) References Cited

U.S. PATENT DOCUMENTS

| | | | | |
|---|---|---|---|---|
| 2,619,402 A | * | 11/1952 | McCutcheon | ............. 200/38 B |
| 3,165,373 A | * | 1/1965 | Scott | ........................... 340/937 |
| 4,717,915 A | | 1/1988 | Goede | |
| 4,866,438 A | | 9/1989 | Knisch | |
| 4,988,994 A | * | 1/1991 | Loeven | ........................ 340/936 |
| 5,041,828 A | | 8/1991 | Loeven | |
| 5,491,464 A | | 2/1996 | Carter et al. | |
| 5,515,042 A | * | 5/1996 | Nelson | ........................ 340/936 |
| 5,563,590 A | * | 10/1996 | Mira | ........................... 340/936 |
| 5,677,979 A | | 10/1997 | Squicciarini et al. | |
| 5,734,337 A | * | 3/1998 | Kupersmit | .................. 340/936 |
| 5,935,190 A | | 8/1999 | Davis et al. | |
| 5,938,717 A | * | 8/1999 | Dunne et al. | ................ 340/937 |
| 6,188,329 B1 | * | 2/2001 | Glier et al. | .................. 340/933 |
| 6,317,682 B1 | * | 11/2001 | Ogura et al. | ................ 340/993 |

FOREIGN PATENT DOCUMENTS

| | | |
|---|---|---|
| DE | 3804750 | 4/1989 |
| DE | 3908069 | 9/1990 |
| DE | 4032459 | 4/1992 |
| EP | 0347090 A3 | 12/1989 |
| EP | 0347090 A2 | 12/1989 |
| WO | WO9628801 | 9/1996 |
| WO | WO9805016 | 2/1998 |
| WO | WO9946613 | 9/1999 |

OTHER PUBLICATIONS

Raja, et al., "Segmentation and Tracking Using Colour Mixture Models", Computer Vision—ACCV'98, Lecture Notes in Computer Science 1351.

* cited by examiner

Primary Examiner—John Tweel
(74) Attorney, Agent, or Firm—Gregory L. Thorne

(57) ABSTRACT

A device for identifying vehicles traveling in excess of a predetermined speed. The device including: speed measurement detector for measuring the speed of a target vehicle and outputting a signal indicative of the measured speed; a camera operatively connected to the speed measurement detector for capturing image data of a license plate affixed to the target vehicle when the target vehicle exceeds the predetermined speed; and a device for tagging the captured image data with the signal indicative of the measured speed of the target vehicle. The device can further have a recognition system for recognizing the license plate of the target vehicle which controls the camera to provide an enhanced view of the license plate. The device can also have classification and color identification systems for identifying a type and color of the target vehicle. The type and color information can also be tagged to the image data.

8 Claims, 2 Drawing Sheets

US 6,696,978 B2

COMBINED LASER/RADAR-VIDEO SPEED VIOLATION DETECTOR FOR LAW ENFORCEMENT

BACKGROUND OF THE INVENTION

1. Field of the Invention

The present invention relates generally to laser and radar speed detectors, and more particularly, to laser and radar speed detectors having a camera for capturing image data of a license plate and other identifying data of an automobile.

2. Prior Art

Conventional laser/radar speed violation detectors used by law enforcement officials do not use any form of visual input for vehicle identification. This problem becomes specifically acute when the laser/radar gun is pointed at one vehicle but there are other vehicles around. In such a case, not only can the police make a wrong decision, but a defendant can use legal means to repudiate the law enforcement officer's evidence.

It is known in the art to capture bar code image data positioned on the license plate of a car in order to identify the car. For instance, if the car is speeding, a summons can be sent to the car's owner. However, unless the camera is well positioned directly in view of the bar-code, such an image is very difficult to obtain.

SUMMARY OF THE INVENTION

Therefore it is an object of the present invention to provide a device for identifying vehicles traveling in excess of a predetermined speed limit which overcomes the disadvantages of the prior art.

It is another object of the present intention to provide a device for identifying vehicles traveling in excess of a predetermined speed limit which easily obtains identifying data from a target vehicle under less than perfect conditions.

It is still a further object of the present invention to provide a device for identifying vehicles traveling in excess of a predetermined speed limit which is difficult to repudiate by an offender.

Accordingly, a device for identifying vehicles traveling in excess of a predetermined speed is provided. The device comprises: speed measurement means for measuring the speed of a target vehicle and outputting a signal indicative of the measured speed; a camera operatively connected to the speed measurement means for capturing image data of a license plate affixed to the target vehicle when the target vehicle exceeds the predetermined speed; and tagging means for tagging the captured image data with the signal indicative of the measured speed of the target vehicle.

The device preferably further comprises: a recognition system for recognizing the license plate of the target vehicle; and at least one of a pan, tilt, and zoom motors operatively connected to the camera and controlled by the recognition system to provide an enhanced view of the license plate.

More preferably, the device further comprises classification means for classifying the type of target vehicle and outputting a signal indicative of the type of target vehicle, wherein the tagging means further tags the captured image data with the signal indicative of the type of target vehicle.

Still more preferably, the device further comprises color distribution identification means for identifying a color distribution of the target vehicle and outputting a signal indicative of the color distribution of the target vehicle, wherein the tagging means further tags the captured image data with the signal indicative of the color distribution of the target vehicle.

The tagging means preferably comprises: conversion means for converting the signals indicative of the measured speed of the target vehicle, the type of the target vehicle, and/or the color distribution of the target vehicle into alpha-numeric data; and combining means for combining the image data and the alpha numeric data. The device preferably further comprises transmitting means for transmitting the tagged image data, such as to other law enforcement vehicles within a predetermined distance.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Although this invention is applicable to numerous and various types of vehicles, it has been found particularly useful in the environment of automobiles. Therefore, without limiting the applicability of the invention to automobiles, the invention will be described in such environment.

Figure 1:
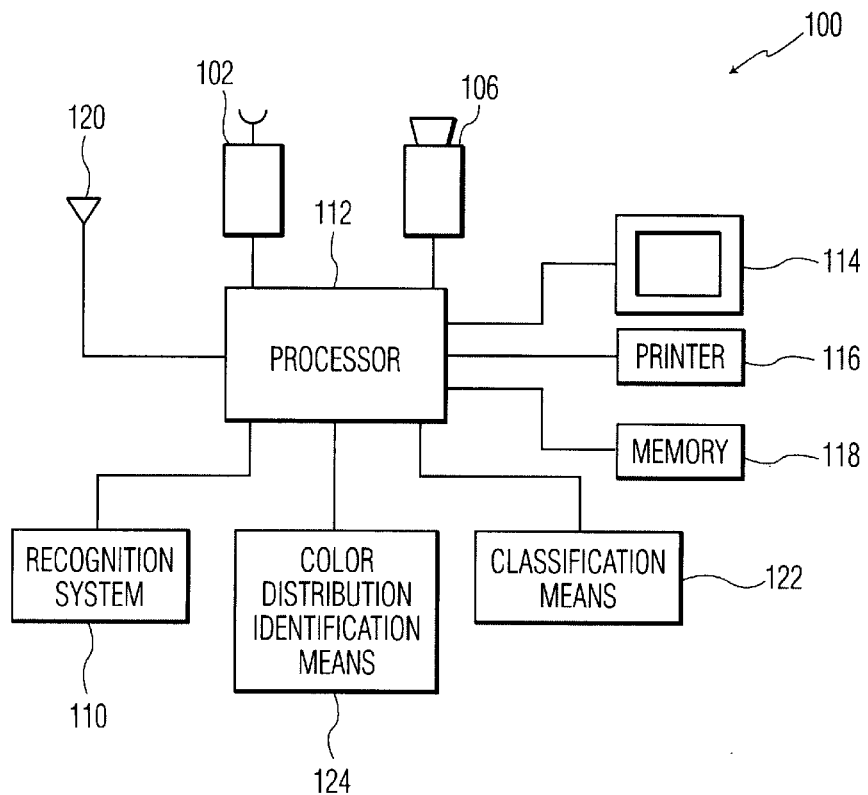
FIG. 1 illustrates a schematic view of a preferred implementation of the device for identifying vehicles traveling in excess of a predetermined speed of the present invention.
Figure 2:
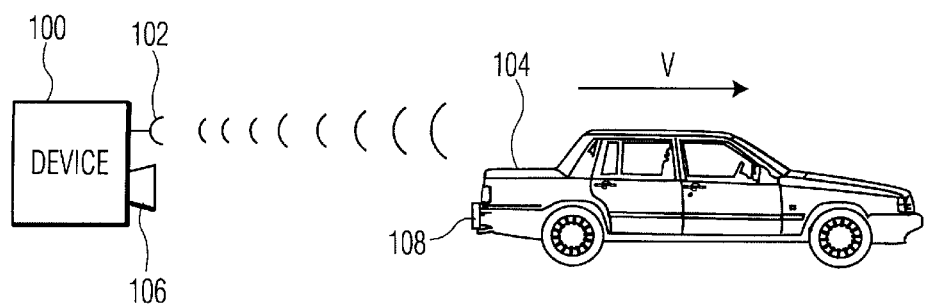
FIG. 2 illustrates the device of FIG. 1 in operation on a target vehicle.

Referring now to FIGS. 1 and 2, there is illustrated a preferred device for identifying vehicles traveling in excess of a predetermined speed V, the device being generally referred to by reference numeral 100. The device 100 can be a handheld unit, a stationary fixed unit, or fixed to a vehicle, such as a law enforcement vehicle.

The device comprises a speed measurement means 102, such as a radar or laser speed detector. The speed measurement means measures the speed of a target vehicle 104 and outputting a signal indicative of the measured speed. The function and use of such speed measurement means 102 are well known in the art.

The device 100 also includes a camera 106 operatively connected to the speed measurement means 102 for capturing image data of a license plate 108 affixed to the target vehicle 104 when the target vehicle 104 exceeds the predetermined speed V. The camera 106 can be a fixed camera integral with the speed detecting means 102 which is pointed at and captures an image of the license plate 108 of the target vehicle 104.

Figure 3:
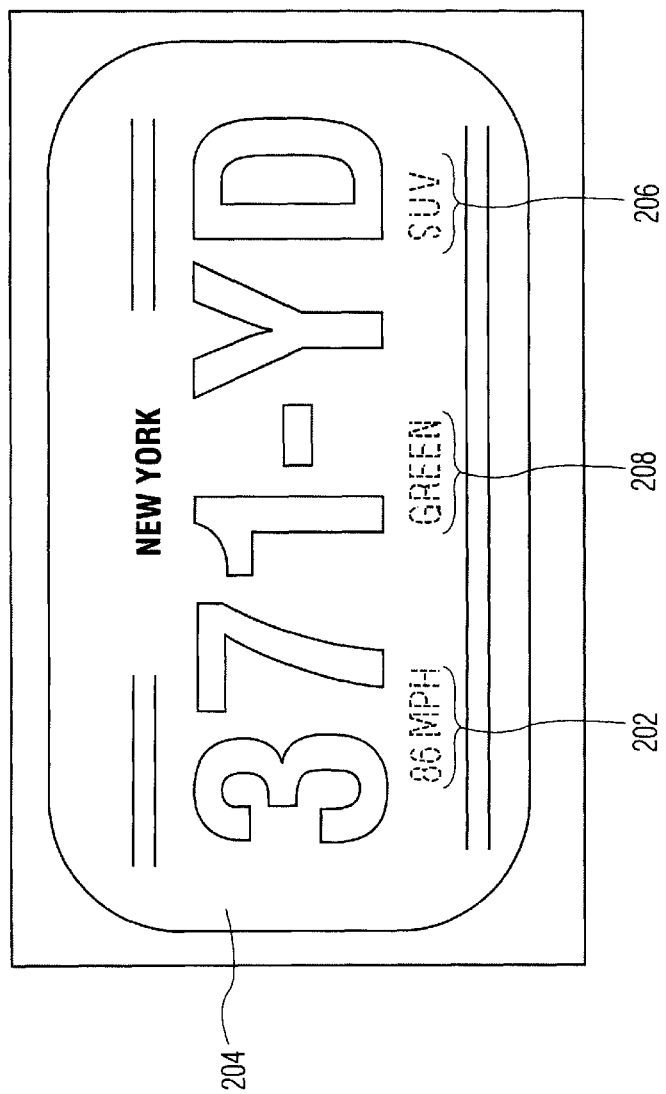
FIG. 3 illustrates an example of a license plate image tagged with identifying alphanumeric data generated by the device of FIG. 1.

However, alternatively, the camera 106 can be separately mounted from the speed measurement means 102 and can have at least one of a pan, tilt, and zoom motors under the control of a recognition system 110. In which case, the recognition system 110 recognizes the license plate 108 of the target vehicle 104 when the camera receives the signal from the speed detecting means 102 that the target vehicle 104 is traveling in excess of the predetermined speed V and provides an enhanced view of the license plate 108, as is illustrated in FIG. 3. The camera 106 may receive the signal either directly from the speed recognition means 102 or through a central processor 112. Such a signal may be automatically generated upon exceeding the predetermined speed V or upon manual input by the operator of the device 100.

Recognition systems are well known in the art, such as that disclosed in co-pending U.S. application Ser. No. 09/794,443 to Gutta et al., entitled Classification of Objects through Model Ensembles, filed Feb. 27, 2001, the entire contents of which is incorporated herein by its reference.

Referring now to FIG. 3, the device 100 also comprises a means, such as the central processor 112 for tagging the captured image data with the signal indicative of the measured speed V of the target vehicle 104. The tagging may comprise adding a header to the captured image data. Alternatively, the signal indicative of the measured speed V of the target vehicle 104 is converted into alpha-numeric data 202 and such alphanumeric data 202 is combined with the image data.

Preferably, the alpha-numeric data 202 is overlaid over the image 204 of the license plate 108. The combined alpha-numeric data indicating the target vehicle's 104 speed V and the captured image data can then be displayed on a monitor 114, printed on a printer 116, stored in a peripheral device 118, or transmitted to a remote site via transmitter 120, all of which are preferably under the control of the central processor 112. The remote site can be another law enforcement vehicle within a predetermined distance who can track and "pull-over" the target vehicle 104 and personally issue a speeding summons to the driver. Alternatively, the remote site can be a local police station from which a summons can be issued by mail or other means to the owner of the target vehicle.

To aid in further identifying the target vehicle 104, the device 100 can further comprise a classification means 122, also preferably under the control of the central processor 112. The classification means 122, after receiving the signal from the speed measurement means 102 (either directly or through the central processor 112) that the speed of the target vehicle exceeds the predetermined speed V, analyzes the captured image data from the camera 102 and classifies the type of target vehicle 104. The classification means 122 outputs a signal indicative of the type of target vehicle, which could include such types as, sport-utility vehicle, passenger car, small truck, and large truck.

Such classification means are well known in the art, such as co-pending U.S. application Ser. No. 09/794,443 to Gutta et al., discussed above.

In order to classify the type of target vehicle 104, the camera 106 would need to change its operating parameters to operate in a wider field of view, such as by zooming out from a view of the license plate 108 to a view of the entire target vehicle 104 or at least enough of the target vehicle 104 to make such a classification determination. Alternatively, a dedicated second camera (not shown) could be utilized for capturing image data of the target vehicle 104 for the purpose of classification of the type of target vehicle 104.

Preferably, the captured image data of the license plate 108 is tagged with the image data of the target vehicle 104 or with the signal indicative of the type of target vehicle. As discussed above with regard to the signal indicative of the measured speed of the target vehicle, the signal indicative of the type of target vehicle 104 can be tagged as a header to the captured image data or converted into alpha-numeric data. The alpha numeric data of the vehicle type 206 can be similarly overlaid over the image of the license plate 204.

Furthermore, to provide yet further identification of the target vehicle 104, the device 100 can further comprise color distribution identification means 124 for identifying a color distribution of the target vehicle 104 and outputting a signal indicative of the color distribution of the target vehicle 104. As with the classification means 122, the color distribution classification means 124 analyzes captured image data of the entire target vehicle 104 or at least enough of the target vehicle to make such a determination, from the camera 106 or a second dedicated camera (not shown).

Such color distribution classification means are well known in the art, such as that disclosed in Yogesh Raja et al., *Segmentation and Tracking using Colour Mixture Models*, 3rd Asian Conference on Computer Vision, Vol. 1, 609–614, Hong Kong, China, 1998, the entire contents of which is incorporated herein by its reference.

The signal indicative of the color distribution of the target vehicle 104 is also preferably tagged to the captured image data of the license plate 108 of the target vehicle 104. As discussed above, such signal can be added as a header to the captured image data or converted into alpha-numeric text 208 and overlaid over the image of the license plate 204.

Also as discussed above, the captured image data of the license plate of the target vehicle tagged with the speed, type, and/or color of the target vehicle 104 can be printed, displayed, stored and/or transmitted to a remote site. Such data could then be used by law enforcement officials to issue a speeding violation by identifying the target vehicle by its license plate number, color, and/or type. Those skilled in the art will appreciate that the device 100 of the present intention, unlike the devices of the prior art, generates identifying data of a target vehicle which is more easily obtained under less than perfect conditions and is more difficult for an offender to repudiate.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device for identifying vehicles traveling in excess of a predetermined speed, the device comprising:

speed measurement means for measuring the speed of a target vehicle and outputting a signal indicative of the measured speed;

a camera operatively connected to the speed measurement means for capturing image data of a license plate affixed to the target vehicle when the target vehicle exceeds the predetermined speed;

tagging means for tagging the captured image data with the signal indicative of the measured speed of the target vehicle; and classification means or classifying the type of target vehicle and outputting a signal indicative of the type of target vehicle, wherein the tagging means further tags the captured image data with the signal indicative of the type of target vehicle.

2. The device of claim 1, wherein the tagging means comprises:

conversion means for converting the signals indicative of the measured steed of the target vehicle and the type of the target vehicle into alpha-numeric data; and combining means for combining the image data and the alpha numeric data.

3. A device for identifying vehicles traveling in excess of a predetermined speed, the device comprising:

speed measurement means for measuring the speed of a target vehicle and outputting a signal indicative of the measured speed;

a camera operatively connected to the speed measurement means for capturing image data of a license plate affixed to the target vehicle when the target vehicle exceeds the predetermined speed;

tagging means for tagging the captured image data with the signal indicative of the measured speed of the target vehicle; and color distribution identification means for identifying a color distribution of the target vehicle and outputting a signal indicative of the color distribution of the target vehicle, wherein the tagging means further tags the captured image data with the signal indicative of the color distribution of the target vehicle.

4. The device of claim 3, wherein the tagging means comprises:

conversion means for converting the signals indicative of the measured speed of the target vehicle and the color distribution of the target vehicle into alpha-numeric data; and combining means for combining the image data and the alpha numeric data.

5. A method for identifying vehicles traveling in excess of a predetermined speed, the method comprising:

measuring the speed of a target vehicle and outputting a signal indicative of the measured speed;

capturing image data of a license plate affixed to the target vehicle when the target vehicle exceeds the predetermined speed;

tagging the captured image data with the signal indicative of the measured speed of the target vehicle; and classifying the type of target vehicle and outputting a signal indicative of the type of target vehicle, wherein the captured image data is further tagged with the signal indicative of the type of target vehicle.

6. The method of claim 5, wherein the tagging comprises:

converting the signals indicative of the measured speed of the target vehicle and the type of the target vehicle into alpha-numeric data; and combining the image data and the alpha numeric data.

7. A method for identifying vehicles traveling in excess of a predetermined speed, the method comprising:

measuring the speed of a target vehicle and outputting a signal indicative of the measured speed;

capturing image data of a license plate affixed to the target vehicle when the target vehicle exceeds the predetermined speed;

tagging the captured image data with the signal indicative of the measured speed of the target vehicle; and identifying a color distribution of the target vehicle and outputting a signal indicative of the color distribution of the target vehicle, wherein the captured image data is further tagged with the signal indicative of the color distribution of the target vehicle.

8. The method of claim 7, wherein the tagging comprises:

converting the signals indicative of the measured speed of the target vehicle and the color distribution of the target vehicle into alpha-numeric data; and combining the image data and the alpha-numeric data.

* * * * *